(12) United States Patent
Al Sayeed et al.

(10) Patent No.: US 11,870,488 B2
(45) Date of Patent: Jan. 9, 2024

(54) FAST FIBER TRANSIENT LOCATING SYSTEMS AND METHODS

(71) Applicant: Ciena Corporation, Hanover, MD (US)

(72) Inventors: Choudhury A. Al Sayeed, Stittsville (CA); Lorenzo Lepore, Montreal (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/680,593

(22) Filed: Feb. 25, 2022

(65) Prior Publication Data
US 2023/0275656 A1    Aug. 31, 2023

(51) Int. Cl.
*H04B 10/07*    (2013.01)
*H04B 10/071*   (2013.01)
*H04B 10/079*   (2013.01)
*G01M 11/00*    (2006.01)

(52) U.S. Cl.
CPC ....... *H04B 10/071* (2013.01); *H04B 10/0791* (2013.01); *G01M 11/3109* (2013.01); *H04B 10/07* (2013.01); *H04B 10/079* (2013.01); *H04B 10/07955* (2013.01)

(58) Field of Classification Search
CPC .. H04B 10/071; H04B 10/0791; H04B 10/07; H04B 10/079; H04B 10/07955; G01M 11/3109
USPC ...................................................... 398/9–38
See application file for complete search history.

(56) References Cited

U.S. PATENT DOCUMENTS

| | | | |
|---|---|---|---|
| 8,509,621 B2 | 8/2013 | Boertjes et al. | |
| 9,344,191 B2 | 5/2016 | Al Sayeed et al. | |
| 9,485,013 B2 | 11/2016 | Al Sayeed et al. | |
| 9,577,763 B2 | 2/2017 | Al Sayeed et al. | |
| 9,756,405 B2 | 9/2017 | Swinkels et al. | |
| 9,768,902 B2 | 9/2017 | Al Sayeed et al. | |
| 9,806,803 B2 | 10/2017 | Bownass et al. | |
| 9,882,634 B1 | 1/2018 | Al Sayeed et al. | |
| 9,906,294 B2 | 2/2018 | Al Sayeed et al. | |
| 9,973,295 B2 | 5/2018 | Al Sayeed et al. | |
| 9,985,726 B1 | 5/2018 | Al Sayeed et al. | |
| 9,986,317 B1 | 5/2018 | Al Sayeed et al. | |
| 10,063,313 B1 | 8/2018 | Al Sayeed et al. | |
| 10,237,011 B2 | 3/2019 | Al Sayeed et al. | |
| 10,361,957 B1 | 7/2019 | MacKay et al. | |
| 10,411,796 B1 * | 9/2019 | Archambault | H04B 10/27 |
| 10,439,709 B1 | 10/2019 | Al Sayeed | |
| 10,536,235 B2 | 1/2020 | Al Sayeed et al. | |
| 10,547,404 B1 * | 1/2020 | Al Sayeed | H04B 10/0777 |
| 10,686,543 B1 | 6/2020 | Al Sayeed et al. | |

(Continued)

FOREIGN PATENT DOCUMENTS

| | | |
|---|---|---|
| EP | 3804184 A1 | 4/2021 |
| WO | 2020102011 A1 | 5/2020 |

(Continued)

*Primary Examiner* — Dibson J Sanchez
(74) *Attorney, Agent, or Firm* — Baratta Law PLLC; Lawrence A. Baratta, Jr.

(57) ABSTRACT

Systems and methods include detecting a fast fiber transient on a span based on analyzing power data, wherein the power data is for any of optical wavelengths of traffic channels, optical service channel (OSC) wavelengths, and telemetry from a network element; and responsive to detecting the fast fiber transient, causing an optical time domain reflectometer (OTDR) trace on the span with a specific configuration based on the fast fiber transient.

18 Claims, 4 Drawing Sheets

(56) References Cited

U.S. PATENT DOCUMENTS

| | | | |
|---|---|---|---|
| 10,833,791 B1 | 11/2020 | Al Sayeed | |
| 10,897,321 B1 | 1/2021 | Al Sayeed et al. | |
| 10,985,838 B1 | 4/2021 | Al Sayeed et al. | |
| 10,992,374 B1 | 4/2021 | Miedema et al. | |
| 11,057,690 B2 | 7/2021 | Al Sayeed et al. | |
| 11,108,489 B1 | 8/2021 | Archambault et al. | |
| 11,223,423 B1 | 1/2022 | Al Sayeed et al. | |
| 2003/0198474 A1* | 10/2003 | Mooney | H03K 5/082 398/140 |
| 2009/0323050 A1* | 12/2009 | Tekawa | G01M 11/3145 356/73.1 |
| 2010/0322620 A1* | 12/2010 | Wellbrock | H04B 10/038 356/73.1 |
| 2014/0055777 A1* | 2/2014 | Archambault | G01M 11/3145 356/73.1 |
| 2014/0056582 A1* | 2/2014 | Roberts | H04B 10/07955 398/28 |
| 2014/0072306 A1* | 3/2014 | Sridhar | H04B 10/071 398/16 |
| 2014/0077971 A1* | 3/2014 | Archambault | H01S 3/302 340/870.04 |
| 2016/0109327 A1* | 4/2016 | Viswanathan | G01M 11/3145 356/73.1 |
| 2017/0033862 A1* | 2/2017 | Dupuis | H04B 10/07955 |
| 2017/0163337 A1* | 6/2017 | Djukic | H04B 10/079 |
| 2018/0123687 A1* | 5/2018 | Chang | H04J 14/08 |
| 2019/0356407 A1 | 11/2019 | Al Sayeed et al. | |
| 2020/0076499 A1 | 3/2020 | Al Sayeed et al. | |
| 2020/0116591 A1* | 4/2020 | Perron | H04B 10/0771 |
| 2020/0350986 A1* | 11/2020 | Ahadian | H04B 10/07955 |
| 2021/0089830 A1* | 3/2021 | Invernizzi | G06F 18/2451 |
| 2021/0328704 A1 | 10/2021 | Al Sayeed et al. | |
| 2022/0029702 A1 | 1/2022 | Al Sayeed et al. | |
| 2022/0123833 A1* | 4/2022 | Desplat | G01M 11/3109 |

FOREIGN PATENT DOCUMENTS

| | | |
|---|---|---|
| WO | 2020150010 A1 | 7/2020 |
| WO | 2020210269 A1 | 10/2020 |
| WO | 2021141942 A1 | 7/2021 |
| WO | 2021162753 A1 | 8/2021 |

* cited by examiner

FAST FIBER TRANSIENT LOCATING SYSTEMS AND METHODS

FIELD OF THE DISCLOSURE

The present disclosure generally relates to optical networking systems and methods. More particularly, the present disclosure relates to systems and methods for fast optical (Fiber) Transient locating systems and methods.

BACKGROUND OF THE DISCLOSURE

As described herein, fiber events in optical networks include, without limitation, fiber cuts, fiber pinches, poor fiber splices, polarization transients, changes in optical power, change in Signal to Noise Ratio (SNR), etc. That is, an event, or transient, is anything that causes degradation (e.g., bit errors loss of polarization tracking, etc.) or loss in an optical signal (e.g., Loss of Frame (LOF), Loss of Signal (LOS), etc.). Conventional techniques for detecting fiber transient events includes manually or automatically performing Optical Time Domain Reflectometer (OTDR) scans after the event has taken place and concluded. This process of detecting transients is advantageous for transients that cause optical line fail (OLF) conditions that still exist, i.e., persistent failures; however, these optical networks also experience fast fiber transient events that occur typically, in the range of seconds. These fast fiber transient events can cause loss of data traffic without causing an OLF. Fast fiber transient events occur throughout the world and may be concentrated where fibers are poorly managed. These poorly managed fiber plants also experience extremely high fiber break incidents that also makes the management of the fiber plant a very difficult condition to uphold quality. When a fiber break occurs, OTDR scans are conducted either manually or automatically from both directions of a fiber span to find the location of the fiber cut, once the location is identified, repair crews are dispatched to the fiber break location.

For fast fiber transient events, the OTDR scan does not reveal anything as the event has already concluded. Specifically, fast fiber transient events occur and last on the order of seconds, such as up to 10 seconds or so. OTDR scans conventionally take on the order of tens of seconds or minutes. Detecting and isolating fast fiber transient events in a mesh network is an extremely difficult process that typically requires time-consuming debugging and correlation of multiple events in the network among different fiber spans. The process of correlating and coordinating events among the different spans and finding the fast fiber transient events can take many days or weeks in duration and include manual means of coordinating, correlating, and interpreting data. The exact root cause of fast fiber transient events in such networks is yet to explain. Typically, fast fiber transient events are found in metro network deployments in highly developing regions with a great deal of on-going construction nearby that may inflict seismic activity on the ground fiber, for example with piling-blows. There could be potential impact from other fiber damaging sources as well.

As conventional OTDR scans take too long, there is no conventional approach to localize fast fiber transient events, and thus no way for technicians to be sent out to a specific location for repair.

BRIEF SUMMARY OF THE DISCLOSURE

The present disclosure relates to systems and methods for detecting and locating fast fiber transient events. Specifically, the present disclosure includes detecting fast fiber transient events and triggering OTDR traces from the device by proactively adjusting OTDR parameters matching previous transient events to detect and locate the transient origins. Again, even if the problematic fiber-span would have been known, running OTDR traces on that fiber at a later time does not reveal anything as the OTDR traces typically take ~60 seconds and the fast fiber transient events (e.g., $\Leftarrow$10 s) need to be caught on OTDR traces to identify the source locations. Hence, the proactive adjustment is meant to provide a "quick" OTDR trace focused on localizing the fast fiber transient events.

In an embodiment, a method includes steps of detecting a fast fiber transient on a span based on analyzing power data, wherein the power data corresponds to at least one of optical wavelengths of traffic channels, optical service channel (OSC) wavelengths, and telemetry from a network element; and responsive to detecting the fast fiber transient, controlling execution of an optical time domain reflectometer (OTDR) trace on the span with a specific configuration. The OTDR trace can be executed in a counter-propagating direction. The specific configuration can be based on the detected fast fiber transient. The steps can further include determining a location of the fast fiber transient based on the OTDR trace. The location can be based on analyzing OTDR traces to locate large fiber loss changes. The fast fiber transient can be an event on the span that lasts in a range of seconds and which cause errors on optical services without causing a line failure. The detecting can be performed in a module in a network element, and provides detection of the fast fiber transient within milliseconds. The specific configuration of the OTDR can be based on timing associated with the fast fiber transient. The specific configuration of the OTDR can include at least one of acquisition time, pulse width, and distance. The OTDR can be integrated with the network element and includes a wavelength outside of a window of the optical wavelengths of traffic channels.

In another embodiment, a network element includes a plurality of modules including at least one of amplifiers, optical modems, multiplexers/demultiplexers, a controller, and wavelength selective switches, wherein circuitry on one or more of the plurality of modules is configured to detect a fast fiber transient on a span based on analyzing power data, wherein the power data is corresponds to at least one of optical wavelengths of traffic channels, optical service channel (OSC) wavelengths, and telemetry from a network element; and, responsive to detection the fast fiber transient, control execution of an optical time domain reflectometer (OTDR) trace on the span with a specific configuration. The circuitry can be further configured to determine a location of the fast fiber transient based on the OTDR trace. The OTDR trace can be executed in a counter-propagating direction, and wherein the specific configuration is based on the detected fast fiber transient. The fast fiber transient can be an event on the span that lasts in a range of seconds and which cause errors on optical services without causing a line failure. The specific configuration of the OTDR can be based on timing associated with the fast fiber transient. The specific configuration of the OTDR can include at least one of acquisition time, pulse width, and distance.

In a further embodiment, a non-transitory computer-readable medium includes instructions that, when executed, cause one or more processors to perform steps of detecting a fast fiber transient on a span based on analyzing power data, wherein the power data corresponds to at least one of optical wavelengths of traffic channels, optical service channel (OSC) wavelengths, and telemetry from a network element; and responsive to detecting the fast fiber transient, controlling execution of an optical time domain reflectometer (OTDR) trace on the span with a specific configuration. The steps can further include determining a location of the fast fiber transient based on the OTDR trace. The fast fiber transient can be an event on the span that lasts in a range of seconds and which cause errors on optical services without causing a line failure. The OTDR trace can be executed in a counter-propagating direction, and wherein the specific configuration can be based on the detected fast fiber transient.

BRIEF DESCRIPTION OF THE DRAWINGS

The present disclosure is illustrated and described herein with reference to the various drawings, in which like reference numbers are used to denote like system components/process steps, as appropriate, and in which.

DETAILED DESCRIPTION OF THE DISCLOSURE

In various embodiments, the present disclosure relates to systems and processes for detecting and locating fast fiber transient events.

The proposed approach primarily focuses on detecting fast fiber transient events and causing OTDR traces accordingly to identify the location or the source of the fast fiber transient events. More precisely, a line-fiber facing device such as amplifiers or other active line-elements equipped with in-skin (integrated) OTDR instrumentation which detects a sudden drop or gain in power from the receiving end (e.g., by X dB where X=10 dB for example from previously measured data points), an OTDR trace is triggered right away in counter-propagating direction to detect its origin.

Default OTDR parameters are not suitable for detecting and locating fast fiber transient events, therefore the approach may include suitably adjusting OTDR traces for a given span to match the fast fiber transient events and previously measured fiber-distance. The approach may include adjusting OTDR max acquisition time based on previous transient durations, where transient duration is the time duration during which power at different monitors dropped by X dB and then returned at a later time above X dB plus a hysteresis (e.g., 3 dB). For example, one approach of adjusting parameters may include setting OTDR max acquisition time as an average of the last 2x transient events.

The approach also can adjust OTDR pulse-width based on measured or estimated fiber length and a lookup table. For example, if the actual fiber length $\Leftarrow$32 km, then use a short pulse-width of 1 µs, etc. That is, the sole purpose of the OTDR is to support localizing a fast fiber transient event, and the configuration of the OTDR trace is based thereon.

The transient power-drop detection and OTDR trace coordination can be processed by the network device using in-skin (integrated) total power monitoring for different bands of signals (such as total power monitoring for OSC, telemetry, C-band & L-band) and then triggering in-skin (integrated) OTDR traces in a counter-propagating direction to detect and locate events while transient-effects in place. This fast acting approach will take place within the duration of the fast fiber transient event (within seconds).

The approach can also run independently at the device level to detect fiber-events and triggering OTDR without any coordination with controllers or with far-end nodes. A controller can be involved once traces are collected for post-processing alarms, traces and events, or for presetting OTDR configuration parameters for future events based on measured fiber-length and past transient events. The proposed approach allows the total power and OSC/telemetry monitoring device to detect the power drop at the receiving end and trigger OTDR traces right away to locate the problematic location.

Without the proposed approach, even knowing the problematic span is not good enough for service providers or operators as by the time, an external or in-skin (integrated) OTDR is manually triggered to inspect the fiber span, it becomes too late to detect transient events (occurring on the order of seconds or around 10 seconds) and the OTDR trace data always turns out clean.

With the proposed approach, dynamically modifying OTDR parameters based on the specific span and triggering the OTDR traces right away from the device allows the best chance to detect and locate the event locations so that the service provider or operator can take appropriate actions accordingly. It also records the events that significantly reduces network wide investigation times. The proposed approach automatically adjusts acquisition time learning from previous transient events and adjusts pulse widths to minimize dead zones for detections.

The approach can run independent of controller support which means, even if controllers are rebooting or taken out of the system, the approach is still capable of running, saving the traces and detecting the events. This approach not only saves time on reacting to fast fiber-transients, but also eliminates layers of additional dependency on the controller and node level software.

Fast fiber transient events experienced on networks can be large enough to interrupt the traffic without causing an optical line fail (OLF) condition, and short enough that it is not possible to detect with conventional OTDR traces. An OLF is declared when the OSC sees Loss of Frame (LOF) and the input power to the pre-amplifiers go to a Shutoff Threshold Crossed (STC)$\leftarrow$39 dBm. With fast fiber transients, both the OSC and pre-amplifier input power can stay well above their respective LOF and STC level. For example, a fast fiber transient on a typical ~30 kilometer fiber-plant can cause a ~20 dB fiber pinch for a short duration of 5 seconds to 50 seconds, then recover on its own. The ~20 dB dip in loss is not enough to trigger the OSC to the LOF state ($\leftarrow$38 dBm at OSC Rx), considering a typical OSC launch power at transmit end is typically –5 dBm.

The present disclosure includes detecting fast fiber transient events and triggering OTDR traces from the device by proactively adjusting OTDR parameters matching previous transient events to detect and locate the transient origins. The proposed approach allows the total power and Supervisor Channel (OSC/Telemetry) monitoring device to detect the power drop at the receiving end and trigger OTDR traces right away to locate the location of the transient.

In various embodiments, the present disclosure includes a process having steps, a system including at least one processor and memory with instructions that, when executed, cause at least one processor to implement the steps, and a non-transitory computer-readable medium having instructions stored thereon for programming at least one processor to perform the steps.

Example Optical Network

Figure 1:
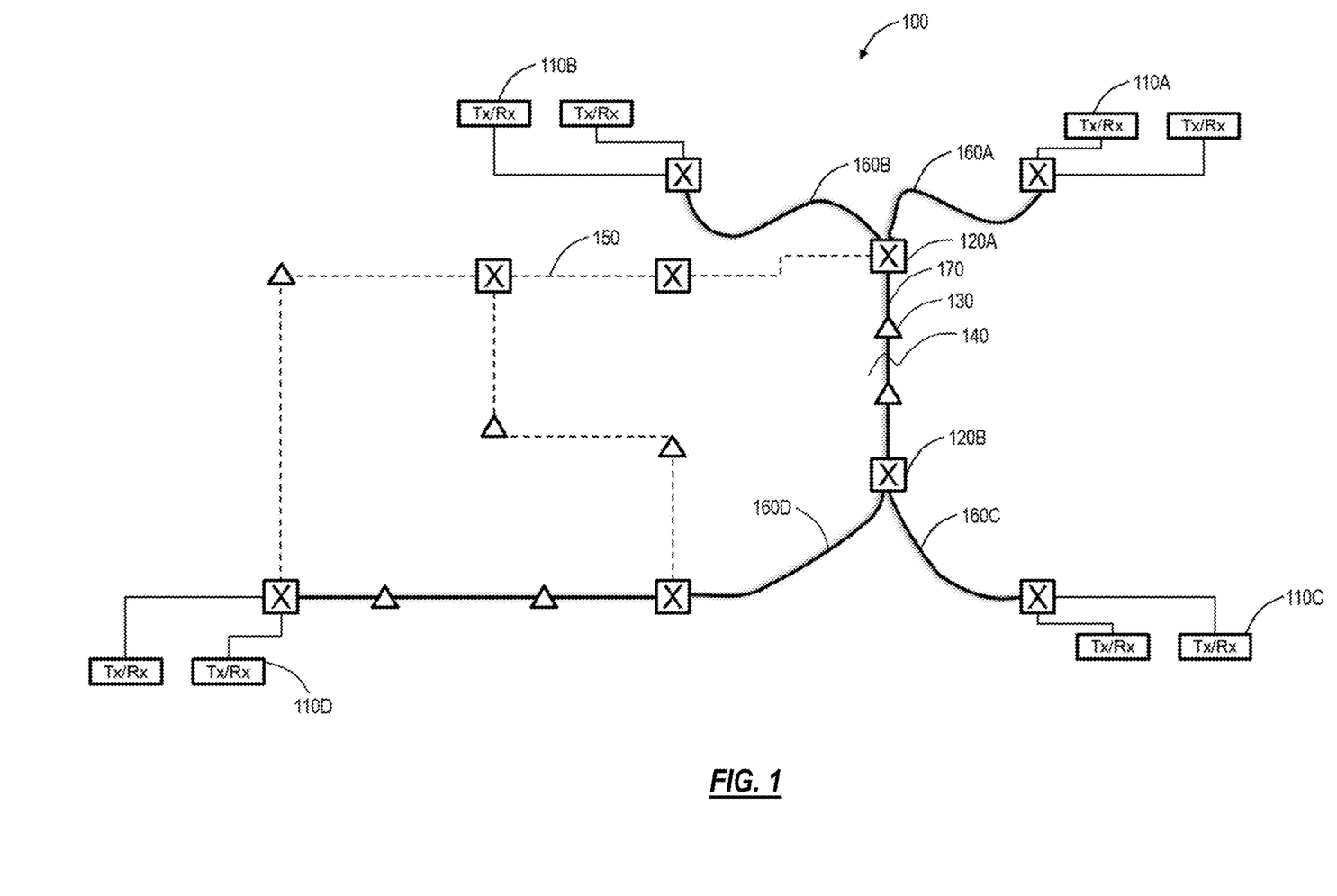
FIG. 1 is network diagram illustrating a mesh fiber network, where fiber transient event on a common path affects multiple circuits.

FIG. 1 is a network diagram of an example mesh optical network 100 with four modems 110A, 1106, 110C, 110D, intermediate optical amplifiers 130, and Reconfigurable Optical Add/Drop Multiplexer (ROADM) nodes 120A, 1206. Of course, those of ordinary skill in the art will recognize the network 100 can include additional modems, amplifiers, fibers, optical components, etc. which are omitted for illustration purposes. The network is merely an optical mesh network between four modems 110A, 1106, 110C, 110D; of course, other networks may include rings, spurs, and combinations thereof. In an embodiment, the modems 110A, 1106, 110C, 110D connect to one another over the fibers 160A, 1606, 160C, 160D, 170. The fiber 170 transmits traffic that includes all modem 110A, 1106, 110C, 110D services and is hence, a common link between all services.

Note, the modems 110A, 1106, 110C, 110D communicate bidirectionally with one another over the fibers 160A, 1606, 160C, 160D, 170. Thus, an event 140 affecting the fiber 170 located between the ROADMs 120A, 1206 will cause an error, transients, signal loss, etc. that are experienced on the data traffic being transmitted and received thru the fibers 160A, 1606, 160C, 160D, 170 correlating with multiple modems 110A, 110B, 110C, 110D. Note, the fibers 160A, 160B, 160C, 160D, 170 can be substantially collocated with one another, i.e., located in a bundle together, traveling along the same geographical route in conduit, underground, as overhead cable, etc. Also, while the fibers 160A, 160B, 160C, 160D, 170 are shown in a unidirectional transmission scheme, the systems and approach can also operate with the bidirectional transmission on the same fiber.

The protection route 150 depicts how during an event 140, more specifically a loss of fiber (LOF) event, the network protocol, such as Optical Transport Network (OTN) utilizing Software-Defined Networking (SDN), is configured to utilize a Layer 0 control plane to reroute the standby wavelength, which is currently on a failed link, across an alternate path so the service can continue. When a short traffic outage (such as ~10 s) takes place on a circuit, conventionally, a network level query has been made to other services that are co-propagating at least one OMS (optical multiplex section) with the service in question, to check if those services received a similar traffic hit for the same time-events. If a similar traffic hit is detected on the other service, further investigation is conducted in each common fiber spans to check for their power monitors min/max history in each span if available. Note that, typically, the min/max power monitor data points (also known as tide-marking) are collected in milliseconds to seconds range and that data can be used in detecting and locating fast fiber transients. Further investigation is done per span to confirm If OSC/telemetry powers are dropped along with total-powers recorded at each monitor If transmit powers to the span were solid for that duration If the power drop was common in both direction of a given span. If so, this further confirms fiber-plant issue since typically bi-directional fiber-pair is placed under the same fiber-conduit Without some Software-Defined Networking (SDN) or analytic-app support, this level of investigation takes days to weeks to isolate problems in a medium sized metro network.

OTDR

An Optical Time Domain Reflectometer (OTDR) is a device that tests the integrity of a fiber cable and is utilized for maintaining and troubleshooting fiber optic systems. An OTDR injects a series of optical pulses into the fiber under test and gathers light that is reflected (backscatter) from points along the fiber. The reflected light gathered is used to characterize the optical fiber. The strength of the return pulses is measured by a sensitive receiver and processed as a function of time and results in both numeric and graphical formats. The graph, also called a trace, will show power level (dB) on the Y-axis, and fiber distance on the X-axis. This graph will show where each connector/connection, splice, or break is located on the fiber cable along with the signal loss (dB). The slope of the trace (dB vs distance) represents fiber attenuation coefficient, the loss in dB represents connectors, splices, breaks, or transients. Interpretation of this data can characterize the fiber cable and can assist in troubleshooting and locating problems within the cable system. OTDR's come in three main categories, Benchtop, Hand-held, and Integrated (in-skin). Performing OTDR tests require setup, programming, execution, and reporting. Test parameter settings for OTDR traces include the following:

Distance/dynamic range: Sets appropriate range based on overall fiber length under test. This variable determines how long of a fiber can be measured. A sufficient dynamic range will produce a clear and smooth indication of the backscatter level at the end of the fiber, an insufficient dynamic range will produce noise at the end of the fiber. Measuring distance is determined by the dynamic range, the insertion loss of devices, the transmission loss of cables, and the loss of fiber joints. The measuring distance is calculated according to the specific fiber span variables.

Pulse Width: Sets the duration of each pulse emitted. Since time is converted to distance, the pulse width has a length. If the pulse width is too short, it loses its energy before the fiber end. A long pulse carries more energy for use in long fibers. A short pulse width enables high resolution and short dead zones, but less dynamic range. A long pulse width enables high dynamic range, but less resolution and large dead zones.

Acquisition Time: Sets the time duration for averaging reflected light measurements. Increasing the acquisition time improves the dynamic range and quality of the trace but result in longer test durations.

A dead zone refers to the distance (or time) where the OTDR cannot detect any dB loss in the cable. There are two types of dead zones: event and attenuation. The event dead zone is the minimum distance after a reflective event where an OTDR can detect another event, alternatively stated, it is the minimum length of fiber that is required between two reflective events. Attenuation dead zone is the minimum distance after a non-reflective event, such as a splice, where an OTDR can accurately measure the loss of a consecutive event. Dead zones can be reduced by using a lower pulse width, but a lower pulse width will decrease the dynamic range. Obtaining a productive OTDR trace that has the ability to detect events is a matter of compromise, which consists of adjusting the OTDR parameters for the specific fiber span under test.

Detecting and Locating Fast Fiber Transients

The proposed approach focuses on detecting fast fiber transients and causing OTDR traces accordingly to identify the location or the source of the fast fiber transient events. More precisely, a line-fiber facing device such as amplifiers or other active line-elements equipped with integrated OTDR instrumentation which detects a sudden drop or gain in power for both the supervisory channel (OSC/Telemetry) and total input-power received on the amplifier receiving end (e.g., by X dB where X=10 dB for example from previously measured data points) and triggers an OTDR trace right away in counter-propagating direction to detect its origin. The process would include, but not limited to, suitably adjusting OTDR configuration parameters such as acquisition time, pulse-width, and distance. This process can be executed in a module in a network element (card level) independent of a controller, providing detection on the order of 100 milliseconds. If a controller were performing the process, latency would be on the order of seconds. The controller process may detect the transient on one card and trigger the OTDR on another, or the detection of total input power and Supervisory channel data may be on separate cards.

Figure 2:
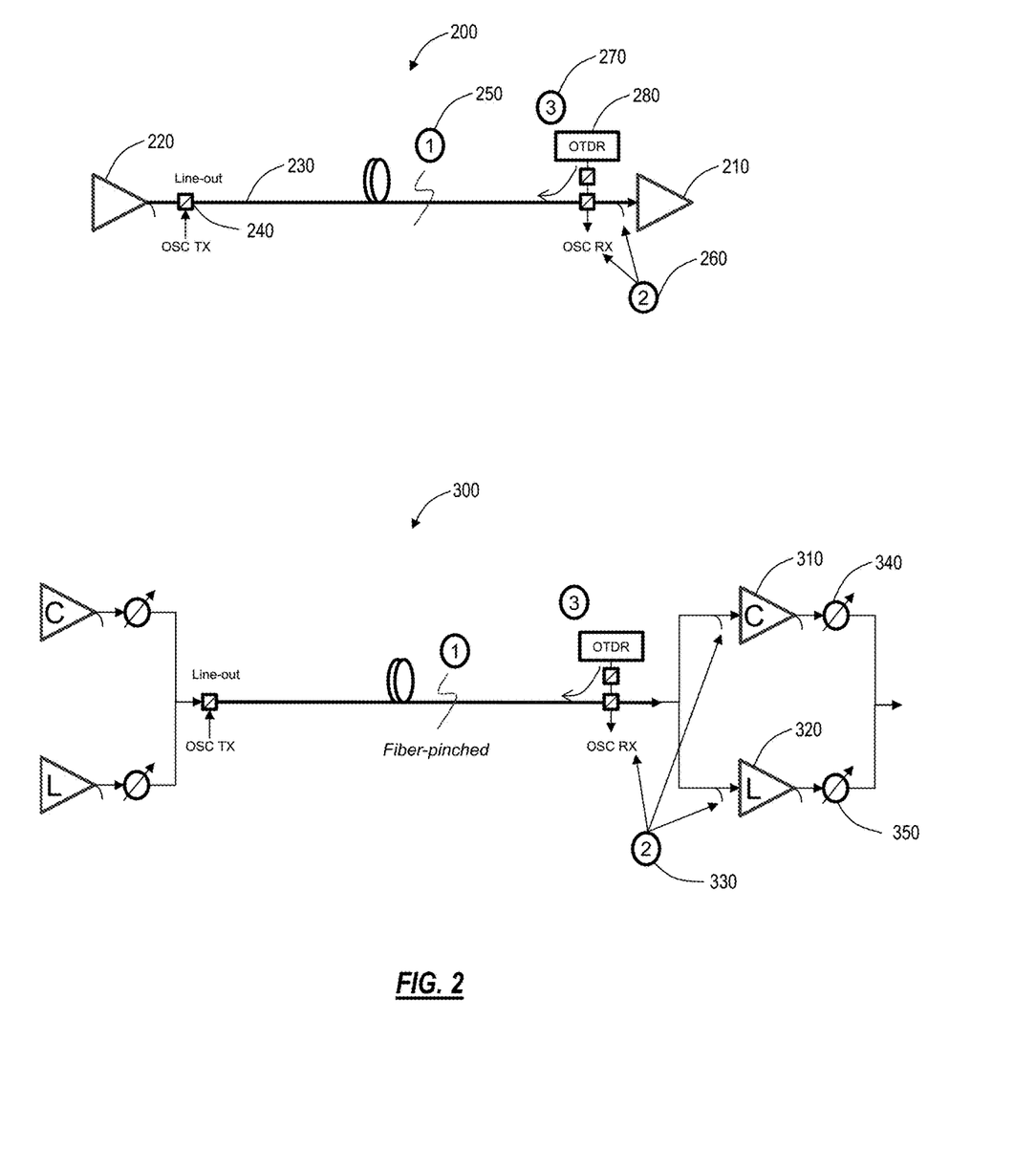
FIG. 2 is a network schematic diagram representing a fast fiber transient event and the process of detecting and locating such transient.

FIG. 2 is a network schematic diagram representing a fast fiber transient event and the process of detecting and locating such transient. There exists two separate schematic diagrams, the top diagram illustrates a network 200 between two optical Amplifiers (EDFA or Raman) 210, 220 interconnected by a fiber 230. Of course, those of ordinary skill in the art will recognize the network 200 can include additional nodes, fibers, optical components, etc. which are omitted for illustration purposes. While the fiber is shown in a unidirectional transmission scheme, the systems and process can also operate with the bidirectional transmission on the same fiber. The couplers 240 are shown to indicate interconnection points into the fiber 230 with the devices shown that are utilized by the process to perform the intended operation to detect and locate fast fiber transients. The network shown also includes in-skin (integrated) OTDR 280 which allows OTDR traces to be triggered without sending testing/repair crews into the field to initiate.

The process for detecting a fast fiber transient event 250, such as a pinched fiber, includes detecting a sudden drop in total power for both the total power monitor and the Supervisory Channel (OSC/telemetry) 260. The data is processed, and power events received are correlated, both on the supervisory channel specific to the span where the event took place, and the overall input power on the amplifier receiving end. This approach will detect a power drop on the span only where the fast fiber transient occurred, the power drop on other spans being communicated with the associated span. The approach will trigger an in-skin OTDR scan 270 right away, on the span where the transient was detected, within 100 ms (or on the order of millisecond) latency on the network, to locate this short duration event. The main settings for OTDR traces are acquisition time, pulse width, and distance. Acquisition time is the time during which the OTDR acquires and averages data points from the fiber under test. Increasing the acquisition time helps to gather more data and have an average which represents this data better. Note, however that the trace is nosier the shorter the acquisition time, therefore too short of an acquisition time could lead to false events on the OTDR trace. Pulse width controls the amount of light injected into a fiber. A short pulse width enables high resolution and short dead zones, but less dynamic range. A long pulse width enables high dynamic range, but less resolution and large dead zones. Distance controls the resolutions, the shorter the distance, the denser the sampling data will be, therefore achieving a better resolution. Below is a table showcasing example pulse width versus maximum distance for the three types of OTDR traces available (Office, Short, and Long).

| Pulse Width (ns) | Distance (m) | | | | | |
|---|---|---|---|---|---|---|
| | 8000 | 16000 | 20000 | 32000 | 64000 | 128000 |
| 30 | Office | | | | | |
| 100 | Office | | | | | |
| 1000 | | Short | Short | Short | | |
| 10000 | | | | | Long | Long |
| 20000 | | | | | Long | Long |

The process disclosed will preset in-skin OTDR configurations based on past experience, determine pre-defined parameters for the span trace and adjust the OTDR configurations to eliminate dead band and control resolution. As an example, most of the spans where fast fiber transients occur are in metropolitan areas (30-40 km), in those cases the OTDR pulse width can be set to run for 1000 ns to 1 ms range. The in-skin OTDR uses processes, algorithms, functions, and techniques to average traces, this approach will modify those processes, algorithms, functions, and techniques to search for a large dip in dB level. Narrowing down the search to those with X dB can detect and locate only the large events in the traces, resulting in faster detection. The approach also records the events that significantly reduces network wide investigation times. A conventional OTDR trace can take approximately 60 seconds to complete, with this approach OTDR traces will be run within the time of the fast fiber transient (In the range of seconds). The proposed approach also automatically adjusts acquisition time learning from previous transient events and adjusts pulse widths to minimize dead zones for detections. The process can include pre-setting OTDR configuration settings which can be determined by recording previous OTDR traces based on past events, averaging those events to determine the best configuration for the given span as well as dynamically adjusting the OTDR configurations as recording data changes. By dynamically adjusting these OTDR configurations to best suite the specific span it can provide the best combination of parameters on the OTDR trace in order to reduce the run time of the OTDR trace. An additional feature to note in this approach, the triggering of the in-skin OTDR will occur when a drop in gain is detected that is large enough to represent an event of note, approximately 20 dB, for instance. During a conventional OTDR trace where the configuration parameters are not dynamically adjusted the OTDR trace averages out the trace and filters out the noise that may come from the trace, in this approach, since we are looking for large dB drops the process can modify the OTDR trace algorithms to accept a "noisier" trace and identify the large dB drop. These traces can be recorded, averaged, and adapted within the algorithm in order speed up the duration of the OTDR trace to better align with the fast fiber transient event.

This process can be executed independent of a controller, however if a controller were performing the process, latency would be within 1 second. The increase in latency with the controller can be attributed to the increase in processing time, for instance, detecting the transient on one network card and trigger the in-skin OTDR on a different network card, or the detection of total input power and Supervisory channel data may be on separate cards.

The network 300 in the lower schematic depicts the same network 200, but further depicts a network schematic operating in a multi-wavelength amplification. In this application fiber carrying both C-band (1530-1565 nm) and L-band (1565-1625 nm) data gets amplified with an EDFA or Raman amplifier 310, 320 operating in parallel for each band. Those bands work with a Variable Optical Attenuator (VOA) 340, 350 to level the output signal gain from each amplifier 310, 320. The wavelengths in a multi-wavelength fiber are de-multiplexed, amplified independently, then re-multiplexed. In a C+L band fiber, the process detects power drop at the supervisory channel (OSC/telemetry) and overall input power on the amplifier receiving end per band 330.

Figure 3:
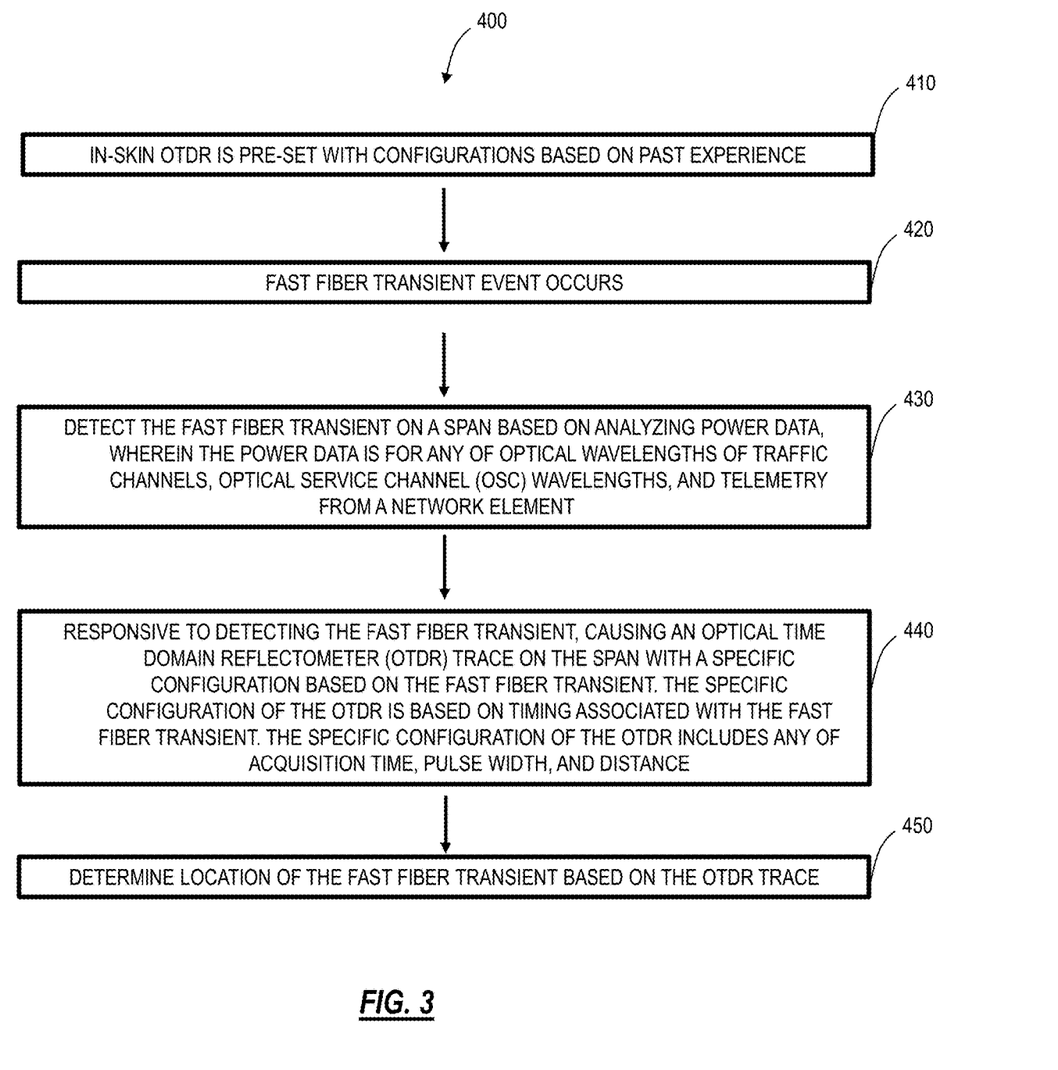
FIG. 3 is a flowchart of the process as described in the claims of detecting and locating a fast fiber transient event.

FIG. 3 is a flowchart of an in-skin fast fiber transient event detection and location process 400 for the networks 200, 300. The fast fiber transient event detection process 400 includes preset in-skin OTDR configurations based on past experience and past transient data, determine pre-defined parameters for the span trace and adjust the OTDR configurations to eliminate dead band and control resolution (Step 410). Next, the event 250 occurs (Step 420), this is a fast fiber transient event which lasts in the range of seconds, and cause errors on optical services without causing a line failure, such events can be caused by fiber pinch, nearby construction activity interference, etc. Step 430 would follow the fast fiber transient event and include detecting the fast fiber transient on the span 250 based on analyzing input power data from supervisory channel (OSC/telemetry) and from the overall input power on the amplifier receiving end 260, 330. The detection is performed in a module in a network element providing detection within 100 milliseconds, the detection can also be performed on the controller level wherein, providing detection within 1 second. The process detects the span where the fast fiber transient has occurred, trigger the in-skin OTDR trace on the span with a specific configuration that the process has the ability to adjust based on timing associated with the fast fiber transient. The specific configuration of the OTDR includes acquisition time, pulse width, and distance. (Step 440). The OTDR is integrated with the network element and includes a wavelength outside of a window of the optical wavelengths of traffic channels. Typically, the OTDR trace can take 60 seconds to complete, in this approach the OTDR trace, with the configuration specific to the span that the process detected the transient, would be applied within 100 milliseconds on the network element level. The OTDR trace data would be processed with algorithms to search for large dip in gain in order to pin point the location of the fast fiber transient (Step 450).

Figure 4:
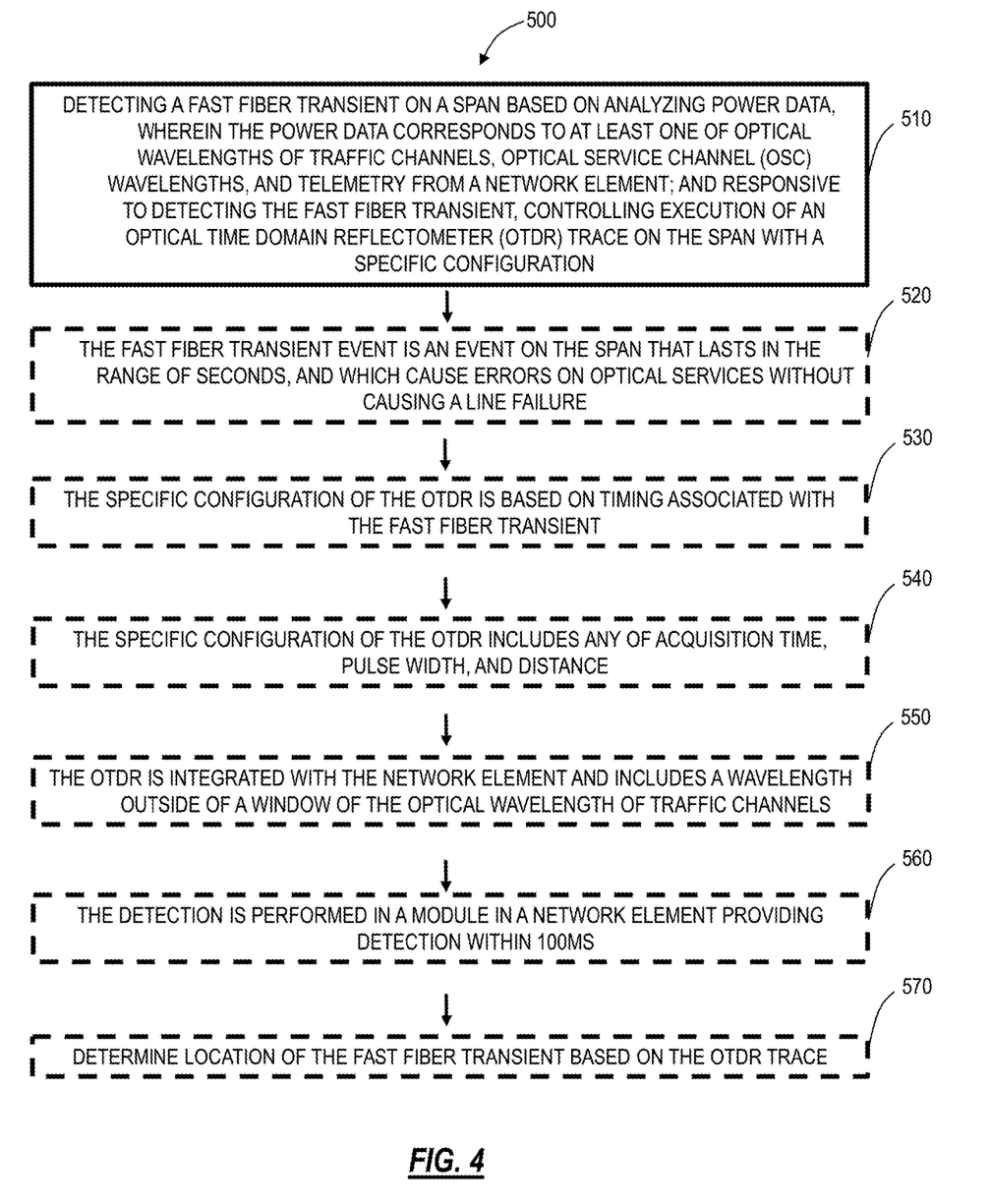
FIG. 4 is a flowchart showing the process as described in the claims in an alternative order as compared to FIG. 3.

FIG. 4 is a flowchart of an in-skin fast fiber transient event detection and location process. The flowchart 500 depicts and summarizes the claims as described herein. The process is to detect a fast fiber transient on a span based on analyzing power data, wherein the power data is for any of optical wavelengths of traffic channels, optical service channel (OSC) wavelengths, and telemetry from a network element; and responsive to detecting the fast fiber transient, causing an OTDR trace on the span where the fast fiber transient was located with specific OTDR configuration parameters based on the fast fiber transient (510). The fast fiber transient event on the span is on the duration of seconds and causes errors on the fiber plant without causing an optical line failure (OLF) (520). The process includes dynamically modifying OTDR configuration parameters including acquisition time, pulse width, and distance (540). The modification of the OTDR configuration parameters will be based on timing associated with the fast fiber transient as well as data such as fiber-length and past transient events (530). The OTDR is integrated with the network element and includes a wavelength outside of a window of traffic channels (550). This detection and triggering of an OTDR trace specific to the span where the fast fiber transient is detected will occur within 100 milliseconds when performed in a module in a network element (560). If a controller were performing the process, latency would be on the order of seconds. This process will create an OTDR trace that is customized for the specific span where the fast fiber transient event was detected and will enable the OTDR trace to be performed with the best resolution and dynamic range for that span. The result of the process is locating fast fiber transient events automatically without time-consuming manual data interpretating, debugging and correlation of multiple events in the network among different fiber spans (570).

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps of:
   detecting a fast fiber transient on a span based on analyzing power data, wherein the power data corresponds to at least one of optical wavelengths of traffic channels, optical service channel (OSC) wavelengths, and telemetry from a network element,
   determining a specific configuration of an optical time domain reflectometer (OTDR) based on the detected fast fiber transient, wherein the fast fiber transient is an event on the span that lasts in a range of seconds and which causes errors on optical services without causing a line failure, and wherein the specific configuration includes settings related to one or more of acquisition time and pulse width of the OTDR based on the detected fast fiber transient and fiber distance such that an OTDR trace completes before an expected end of the fast fiber transient;
   responsive to detecting the fast fiber transient and configuring the OTDR with the specific configuration, causing execution of the OTDR to perform the OTDR trace on the span with the specific configuration; and
   determining a location of the fast fiber transient based on the OTDR trace.

2. The method of claim 1, wherein the OTDR trace is executed in a counter-propagating direction.

3. The method of claim 1, wherein the location is based on analyzing OTDR traces to locate large fiber loss changes.

4. The method of claim 1, wherein the detecting is performed in a module in a network element, and provides detection of the fast fiber transient within milliseconds.

5. The method of claim 1, wherein the specific configuration of an OTDR that performs the OTDR trace is based on timing associated with the fast fiber transient.

6. The method of claim 1, wherein an OTDR that performs the OTDR trace is integrated with the network element and includes a wavelength outside of a window of the optical wavelengths of traffic channels.

7. The method of claim 1, wherein the detecting the fast fiber transient is based on power drops on both the OSC wavelengths and the at least one of optical wavelengths of traffic channels.

8. A network element comprising:
   a plurality of modules including at least one of amplifiers, optical modems, multiplexers/demultiplexers, a controller, and wavelength selective switches,
   wherein circuitry on one or more of the plurality of modules is configured to:
   detect a fast fiber transient on a span based on analyzing power data, wherein the power data corresponds to at least one of optical wavelengths of traffic channels, optical service channel (OSC) wavelengths, and telemetry from a network element;
   determine a specific configuration of an optical time domain reflectometer (OTDR) based on the detected fast fiber transient, wherein the fast fiber transient is an event on the span that lasts in a range of seconds and which causes errors on optical services without causing a line failure, and wherein the specific configuration includes settings related to one or more of acquisition time and pulse width of the OTDR based on the detected fast fiber transient and fiber distance such that an OTDR trace completes before an expected end of the fast fiber transient;
   responsive to detection the fast fiber transient and configuration of the OTDR with the specific configuration, cause execution of the OTDR to perform the OTDR trace on the span with the specific configuration; and
   determine a location of the fast fiber transient based on the OTDR trace.

9. The network element of claim 8, wherein the OTDR trace is executed in a counter-propagating direction.

10. The network element of claim 8, wherein the specific configuration of an OTDR that performs the OTDR trace is based on timing associated with the fast fiber transient.

11. The network element of claim 8, wherein the fast fiber transient is detected based on power drops on both the OSC wavelengths and the at least one of optical wavelengths of traffic channels.

12. A non-transitory computer-readable medium comprising instructions that, when executed, cause one or more processors to perform steps of:
   detecting a fast fiber transient on a span based analyzing power data, wherein the power data corresponds to at least one of optical wavelengths of traffic channels, optical service channel (OSC) wavelengths, and telemetry from a network element,
   determining a specific configuration of an optical time domain reflectometer (OTDR) based on the detected fast fiber transient, wherein the fast fiber transient is an event on the span that lasts in a range of seconds and which causes errors on optical services without causing a line failure, and wherein the specific configuration includes settings related to one or more of acquisition time and pulse width of the OTDR based on the detected fast fiber transient and fiber distance such that an OTDR trace completes before an expected end of the fast fiber transient;
   responsive to detecting the fast fiber transient and configuring the OTDR with the specific configuration, causing execution of the OTDR to perform the OTDR trace on the span with the specific configuration; and
   determining a location of the fast fiber transient based on the OTDR trace.

13. The non-transitory computer-readable medium of claim 12, wherein the OTDR trace is executed in a counter-propagating direction.

14. The non-transitory computer-readable medium of claim 12, wherein the OTDR trace is performed within milliseconds.

15. The non-transitory computer-readable medium of claim 12, wherein the determining is based on a search of a large dip in gain in the OTDR trace.

16. The non-transitory computer-readable medium of claim 15, wherein the large dip is approximately 20 dB or more.

17. The non-transitory computer-readable medium of claim 12, wherein the specific configuration includes adjustments to one or more of acquisition time including use of previous acquisition times, dynamic range, and pulse width, where the adjustments decrease a time for the OTDR trace.

18. The non-transitory computer-readable medium of claim 12, wherein the detecting the fast fiber transient is based on power drops on both the OSC wavelengths and the at least one of optical wavelengths of traffic channels.

* * * * *